(12) United States Patent
Okigami

(10) Patent No.: US 9,122,438 B2
(45) Date of Patent: *Sep. 1, 2015

(54) COMMUNICATION SYSTEM, INFORMATION PROCESSING SYSTEM, IMAGE FORMING APPARATUS AND PORTABLE INFORMATION TERMINAL DEVICE

(71) Applicant: Sharp Kabushiki Kaisha, Osaka-Shi, Osaka (JP)

(72) Inventor: Masafumi Okigami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,475

(22) Filed: May 16, 2014

(65) Prior Publication Data

US 2014/0253969 A1   Sep. 11, 2014

Related U.S. Application Data

(62) Division of application No. 13/865,667, filed on Apr. 18, 2013, which is a division of application No. 12/655,997, filed on Jan. 12, 2010, now abandoned.

(30) Foreign Application Priority Data

Jan. 28, 2009   (JP) ................................ 2009-017209

(51) Int. Cl.
*G06F 3/12*   (2006.01)
*H04M 1/725*   (2006.01)
(Continued)

(52) U.S. Cl.
CPC ............ *G06F 3/1297* (2013.01); *G06F 3/1203* (2013.01); *G06F 3/1211* (2013.01);
(Continued)

(58) Field of Classification Search
CPC .... G06F 3/1203; G06F 3/1236; G06F 3/1292
USPC ............................................ 358/1.15; 399/81
See application file for complete search history.

(56) References Cited

U.S. PATENT DOCUMENTS 7,139,827 B1   11/2006 Iwayama et al.
7,218,644 B1   5/2007 Heinonen et al.
(Continued)

FOREIGN PATENT DOCUMENTS

CN   1309501 A   8/2001
CN   1417676 A   5/2003
(Continued)

OTHER PUBLICATIONS

Telefonaktiebolaget LM Ericsson et al., Specification of the Bluetooth System, V1.0 A, Jul. 26, 1999, 1068 pages. (retrieved from http://www.ece.virginia.edu/~mv/standards/Bluetooth_core_10_a.pdf).

(Continued)

*Primary Examiner* — Fred Guillermety
(74) *Attorney, Agent, or Firm* — Birch, Stewart, Kolasch & Birch, LLP

(57) ABSTRACT

An image forming apparatus includes a first wireless communication unit that receives data from a mobile phone, and a reader-writer that transmits an address of the first wireless communication unit to the mobile phone. The mobile phone includes a contact/non-contact IC card that receives the address, and a second wireless communication unit that transmits image data to the first wireless communication unit utilizing the address. When communication is made between the mobile phone and the image forming apparatus, the address of the first wireless communication unit is transmitted to the contact/non-contact IC card through the reader-writer, and the second wireless communication unit transmits data to the first wireless communication unit utilizing the address.

5 Claims, 10 Drawing Sheets

(51) Int. Cl.
*H04N 1/00* (2006.01)
*G06K 15/00* (2006.01)

(52) U.S. Cl.
CPC ............ *G06F3/1236* (2013.01); *G06F 3/1238* (2013.01); *G06F 3/1268* (2013.01); *G06F 3/1271* (2013.01); *G06F 3/1285* (2013.01); *G06F 3/1292* (2013.01); *G06K 15/40* (2013.01); *H04M 1/7253* (2013.01); *H04N 1/00278* (2013.01); *H04N 1/00307* (2013.01); *H04M 2250/02* (2013.01); *H04N 2201/0041* (2013.01); *H04N 2201/0055* (2013.01); *H04N 2201/0094* (2013.01); *H04N 2201/0096* (2013.01)

(56) References Cited

U.S. PATENT DOCUMENTS

| | | |
|---|---|---|
| 2001/0041056 A1 | 11/2001 | Tanaka et al. |
| 2002/0038372 A1 | 3/2002 | Idehara et al. |
| 2003/0093675 A1 | 5/2003 | Hibino et al. |
| 2003/0129970 A1 | 7/2003 | Kawaoka |
| 2004/0078169 A1 | 4/2004 | Oba et al. |
| 2004/0214524 A1 | 10/2004 | Noda et al. |
| 2004/0259499 A1 | 12/2004 | Oba et al. |
| 2005/0128968 A1 | 6/2005 | Yang |
| 2005/0141040 A1 | 6/2005 | Yamada et al. |
| 2005/0219556 A1 | 10/2005 | Lee et al. |
| 2005/0275864 A1 | 12/2005 | Sugimura et al. |
| 2006/0007485 A1 | 1/2006 | Miyazaki |
| 2006/0044601 A1 | 3/2006 | Misawa et al. |
| 2006/0092971 A1 | 5/2006 | Okita et al. |
| 2006/0223394 A1 | 10/2006 | Porat |
| 2007/0140268 A1 | 6/2007 | Ge et al. |
| 2007/0153320 A1 | 7/2007 | Yamaoka |
| 2007/0174515 A1 | 7/2007 | Sinclair et al. |
| 2007/0201073 A1 | 8/2007 | Masumoto |
| 2007/0201084 A1 | 8/2007 | Tokumaru et al. |
| 2007/0206225 A1 | 9/2007 | Shinohara et al. |
| 2007/0220255 A1 | 9/2007 | Igarashi |
| 2007/0297017 A1 | 12/2007 | Kashioka |
| 2008/0088876 A1 | 4/2008 | Tanaka et al. |
| 2008/0231890 A1 | 9/2008 | Kishi |
| 2008/0239382 A1 | 10/2008 | Matsueda |
| 2008/0252917 A1 | 10/2008 | Kuroda et al. |
| 2008/0287160 A1 | 11/2008 | Sasai et al. |
| 2008/0297607 A1 | 12/2008 | Minatogawa |
| 2009/0066998 A1 | 3/2009 | Kato |
| 2009/0164944 A1 | 6/2009 | Webster et al. |
| 2009/0203349 A1 | 8/2009 | Hollstien |
| 2010/0189286 A1 | 7/2010 | Katsuno |
| 2011/0261389 A1 | 10/2011 | Ohara |

FOREIGN PATENT DOCUMENTS

| | | |
|---|---|---|
| CN | 1657299 A | 8/2005 |
| CN | 1722762 A | 1/2006 |
| CN | 1767500 A | 5/2006 |
| CN | 101005399 A | 7/2007 |
| CN | 101005432 A | 7/2007 |
| CN | 101030960 A | 9/2007 |
| CN | 101094301 A | 12/2007 |
| CN | 101207412 A | 6/2008 |
| JP | 2001-249878 A | 9/2001 |
| JP | 2001-306827 A | 11/2001 |
| JP | 2002-112336 A | 4/2002 |
| JP | 2003-30201 A | 1/2003 |
| JP | 2003-32176 A | 1/2003 |
| JP | 2003-46673 A | 2/2003 |
| JP | 2003-85659 A | 3/2003 |
| JP | 2003-110579 A | 4/2003 |
| JP | 2003-203036 A | 7/2003 |
| JP | 2003-309694 A | 10/2003 |
| JP | 2003-324446 A | 11/2003 |
| JP | 2004-56525 A | 2/2004 |
| JP | 2004-350239 A | 12/2004 |
| JP | 2004-357182 A | 12/2004 |
| JP | 2005-101932 A | 4/2005 |
| JP | 2005-167946 A | 6/2005 |
| JP | 2006-42104 A | 2/2006 |
| JP | 2006-191440 A | 7/2006 |
| JP | 2006-287860 A | 10/2006 |
| JP | 2007-249425 A | 9/2007 |
| JP | 2007-267362 A | 10/2007 |
| JP | 2007-267370 A | 10/2007 |
| JP | 2008-148053 A | 6/2008 |
| JP | 2008-198015 A | 8/2008 |
| JP | 2008-271150 A | 11/2008 |
| JP | 2009-37591 A | 2/2009 |
| WO | WO 03/034660 A1 | 4/2003 |
| WO | WO 2009/020082 A1 | 2/2009 |

OTHER PUBLICATIONS

US Office Action for U.S. Appl. No. 12/655,997, dated Dec. 19, 2012.
US Office Action for U.S. Appl. No. 12/655,997, dated Jul. 27, 2012.
US Office Action for U.S. Appl. No. 12/659,503, dated Feb. 19, 2013.
US Office Action for U.S. Appl. No. 12/659,503, dated Jun. 3, 2013 (Advisory Action).
US Office Action for U.S. Appl. No. 12/659,503, dated Oct. 19, 2012.
US Office Action for U.S. Appl. No. 12/660,825, dated Feb. 13, 2013.
US Office Action for U.S. Appl. No. 12/660,825, dated May 20, 2013 (Advisory Action).
US Office Action for U.S. Appl. No. 12/660,825, dated Oct. 1, 2012.
US Office Action for U.S. Appl. No. 13/904,946 dated Feb. 13, 2014.
US Office Action for U.S. Appl. No. 13/904,946, dated Sep. 20, 2013.
US Office Action for U.S. Appl. No. 13/907,583 dated Feb. 20, 2014.
US Office Action for U.S. Appl. No. 13/907,583, dated Sep. 18, 2013.
US Office Action for U.S. Appl. No. 13/952,548, dated Feb. 14, 2014.
US Office Action for U.S. Appl. No. 13/952,548, dated Sep. 17, 2013.
US Office Action for U.S. Appl. No. 13/952,549 dated Feb. 20, 2014.
US Office Action for U.S. Appl. No. 13/952,549, dated Sep. 12, 2013.
US Office Action for U.S. Appl. No. 13/959,549 dated Feb. 20, 2014.
US Office Action for U.S. Appl. No. 13/959,549, dated Oct. 23, 2013.
US Office Action for U.S. Appl. No. 13/959,665 dated Feb. 14, 2014.
US Office Action for U.S. Appl. No. 13/959,665, dated Oct. 25, 2013.
US Office Action for U.S. Appl. No. 13/959,668 dated Feb. 13, 2014.
US Office Action for U.S. Appl. No. 13/959,668, dated Oct. 24, 2013.
US Office Action for U.S. Appl. No. 13/959,672 dated Feb. 13, 2014.
US Office Action for U.S. Appl. No. 13/959,672, dated Sep. 23, 2013.
US Office Action for U.S. Appl. No. 13/865,667, dated Feb. 13, 2014.
US Office Action for U.S. Appl. No. 13/865,667, dated May 16, 2014 (Advisory Action).
US Office Action for U.S. Appl. No. 13/865,667, dated Sep. 10, 2013.
US Office Action for U.S. Appl. No. 13/904,946, dated Aug. 1, 2014.
US Office Action for U.S. Appl. No. 13/904,946, dated May 20, 2014 (Advisory Action).
US Office Action for U.S. Appl. No. 13/907,583, dated Jul. 2, 2014 (Advisory Action) I.
US Office Action for U.S. Appl. No. 13/952,548, dated Jul. 31, 2014.
US Office Action for U.S. Appl. No. 13/952,548, dated May 28, 2014 (Advisory Action).
US Office Action for U.S. Appl. No. 13/952,549, dated May 16, 2014 (Advisory Action).
US Office Action for U.S. Appl. No. 13/959,549, dated May 16, 2014 (Advisory Action).
US Office Action for U.S. Appl. No. 13/959,665, dated May 29, 2014 (Advisory Action).
US Office Action for U.S. Appl. No. 13/959,668, dated May 16, 2014 (Advisory Action).
US Office Action for U.S. Appl. No. 13/959,672, dated May 16, 2014 (Advisory Action).
US Office Action for U.S. Appl. No. 14/280,446, dated Aug. 13, 2014.
US Office Action for U.S. Appl. No. 14/280,497, dated Aug. 15, 2014.
U.S. Notice of Allowance for U.S. Appl. No. 13/959,665 dated Mar. 2, 2015.

(56) References Cited

OTHER PUBLICATIONS

U.S. Office Action for U.S. Appl. No. 13/907,583 dated May 20, 2014 (Advisory Action).
U.S. Office Action for U.S. Appl. No. 14/280,446 dated Dec. 31, 2014.
U.S. Office Action for U.S. Appl. No. 14/280,492 dated Dec. 17, 2014.
US Communication for U.S. Appl. No. 14/280,497, dated Sep. 8, 2014 (Applicant-Initiated Interview Summary).
US Examiner's Answer to Appeal Brief for U.S. Appl. No. 13/865,667, dated Oct. 21, 2014.
US Examiner's Answer to Appeal Brief for U.S. Appl. No. 13/907,583, dated Oct. 27, 2014.
US Office Action for U.S. Appl. No. 13/952,549, dated Sep. 19, 2014.
US Office Action for U.S. Appl. No. 13/959,549, dated Sep. 19, 2014.
US Office Action for U.S. Appl. No. 13/959,665, dated Aug. 27, 2014.
US Office Action for U.S. Appl. No. 13/959,668, dated Sep. 4, 2014.
US Office Action for U.S. Appl. No. 13/959,672, dated Sep. 30, 2014.
US Office Action for U.S. Appl. No. 14/280,410, dated Oct. 6, 2014.
Symbian Freak, "Bluetooth Pearsonal Area Network (PAN) Guide—Needed," May 18, 2008, pp. 1-8, https://www.symbian-freak.com/forum/viewtopic.php?p=233846.
US Office Action, dated Dec. 8, 2014, for U.S. Appl. No. 13/952,548 (Advisory Action).
US Office Action, dated Feb. 23, 2015, for U.S. Appl. No. 13/959,549 (Advisory Action).
US Office Action, dated Feb. 5, 2015, for U.S. Appl. No. 13/959,668 (Advisory Action).
US Office Action, dated Mar. 18, 2015, for U.S. Appl. No. 14/280,497.
US Office Action, dated Mar. 2, 2015, for U.S. Appl. No. 13/959,672 (Advisory Action).
US Office Action, dated Mar. 25, 2015, for U.S. Appl. No. 14/280,492.
US Office Action, dated Mar. 26, 2015, for U.S. Appl. No. 13/904,946.
US Office Action, dated Mar. 27, 2015, for U.S. Appl. No. 13/952,548.

COMMUNICATION SYSTEM, INFORMATION PROCESSING SYSTEM, IMAGE FORMING APPARATUS AND PORTABLE INFORMATION TERMINAL DEVICE

CROSS-REFERENCE TO RELATED APPLICATIONS

This application is a Divisional of co-pending application Ser. No. 13/865,667 filed on Apr. 18, 2013, which is a Divisional of U.S. application Ser. No. 12/655,997 filed on Jan. 12, 2010. Application Ser. No. 12/655,997 claims priority to Japanese Application 2009-017209 filed on Jan. 28, 2009 the contents of which are incorporated herein by reference in their entirety.

BACKGROUND OF THE INVENTION

1. Technical Field

The present invention relates to a communication system including a plurality of wireless communication devices, an information processing system including a portable electronic apparatus and an information processing device that executes data transmission/reception with the electronic apparatus, an image forming apparatus that receives image data from an external device and forms an image, and a portable information terminal device that executes communication with an external device having two wireless communication units.

2. Description of Related Art

Mobile phones with camera function have lately become very popular and one can easily shoot a digital photo any time and anywhere. Also, the mobile phones have come to carry a large-capacity memory, which encourages the use of the mobile phone as a personal storage device for storing therein data such as the digital photos and business letters. Moreover, with the reduction in size and thickness of the mobile phone, so-called a card-type memory of a fingertip size, or even smaller, has come to be widely employed.

Japanese Patent Application Laid-Open No. 2007-267370 (hereinafter, publicly known literature 1) discloses a wireless communication method arranged such that when a user brings his/her non-contact ID card (or a wireless communication device incorporated therein with the non-contact ID card) close to a card reader-writer unit of an image processor, an IC chip in the non-contact ID card receives weak radio wave bearing the terminal ID indicating the ID of the image processor, being constantly outputted from the card reader-writer unit, to thereby acquire the terminal ID, and transmits the user ID of the non-contact ID card to the image processor utilizing the terminal ID.

Likewise, Japanese Patent Application Laid-Open No. 2003-32176 (hereinafter, publicly known literature 2) discloses a communication system in which a mobile phone includes a non-contact IC card that communicates with a reader-writer of a personal computer via electromagnetic wave, and when a user brings the mobile phone close to the personal computer so that the non-contact IC card receives the electromagnetic wave radiated from the reader-writer, the mobile phone notifies the card ID specified in the non-contact IC card to the personal computer, and the personal computer identifies the mobile phone based on the card ID thus notified, and recognizes the mobile phone as the communication counterpart.

SUMMARY

Meanwhile, methods whereby the user prints data stored in the memory of the mobile phone, such as a digital photo and a business letter, include connecting the memory of the mobile phone to a reading unit of an image forming apparatus for transmitting thereto the data to be printed, and wirelessly transmitting the data to be printed to an image forming apparatus capable of executing wireless data transmission/reception with the mobile phone.

In the case of directly connecting the memory of the mobile phone to the reading unit of the image forming apparatus, the user has to take out the card-type memory from the mobile phone and insert it into the memory card reader of the image forming apparatus. Besides, when the printing is completed the user has to insert the card-type memory back into the mobile phone. Thus, troublesome procedures have to be performed and the card-type memory may be left unremoved from the memory card reader of the image forming apparatus after the printing.

For the wireless transmission of the data to be printed to the image forming apparatus, for example Bluetooth® technology or RFID (Radio Frequency Identification) system may be employed, and alternatively infrared communication may be performed between the mobile phone and the image forming apparatus.

When executing the wireless communication based on the Bluetooth® technology, it is necessary to set the both devices mutually communicatable (certification). For example, in the case where the mobile phone and the image forming apparatus are both Bluetooth®-compatible and the wireless communication based on the Bluetooth® technology is to be performed, it is necessary to execute a setting operation so-called pairing (or bonding), to allow the respective devices to identify the counterpart and to make mutual communication.

However, the pairing requires complicated and troublesome procedures. For example, when the user wants to print image data in the memory of the mobile phone with the image forming apparatus, the user has to retrieve through the mobile phone those image forming apparatus capable of performing the wireless communication in a predetermined radius (for instance, 100 mm), and distinguish the Bluetooth address of the image forming apparatus among the Bluetooth addresses of the plurality of image forming apparatuses listed on the display unit of the mobile phone as a result of the retrieval, however such distinction is very difficult. Besides, the distinction process still has to be followed by finely specified procedures to set the both devices mutually communicable. In addition, in the case where the image forming apparatus is a leased one installed in a convenience store, most of the users are new to the device and therefore the pairing has to be performed each time to thereby newly start up the wireless communication.

In the case of the infrared communication between the mobile phone and the image forming apparatus, the user has to carry out such troublesome operation as holding the mobile phone for a predetermined time, with the infrared port of the mobile phone and that of the image forming apparatus being set to oppose each other, while the data to be printed is wirelessly transmitted.

Further, in the case of the wireless communication based on the RFID system such as Felica® or Edy®, since the communication speed is slow, the mobile phone has to be held up over the image forming apparatus for a predetermined time, for wirelessly transmitting the data to be printed.

The wireless communication method according to the publicly known literature 1 and the communication system according to the publicly known literature 2 are known as the method for simplifying the foregoing operation. More specifically, the wireless communication method according to the publicly known literature 1, and the communication system according to the publicly known literature 2 both employ what is known as the RFID system, so that the user ID in the non-contact ID card (card ID of the non-contact IC card) is automatically transmitted to the image processor (personal computer), when the non-contact ID card (non-contact IC card) is brought close to the card reader-writer unit of the image processor (reader-writer of the personal computer). The wireless communication method according to the publicly known literature 1 and the communication system according to the publicly known literature 2, however, have a drawback in terms of security. For example, the RFID system is widely employed in the daily life circumstances such as electronic payment at a station entrance and a convenience store, and personal ID certification, and hence in the case where the non-contact ID card according to the publicly known literature 1 (non-contact IC card according to the publicly known literature 2) is brought close to a reader-writer prepared for a different purpose, the user ID in the non-contact ID card (card ID of the non-contact IC card) may be automatically transmitted to the reader-writer irrespective of the user's intention and confidential information may leak, which may even provoke an illegal access utilizing the user ID (card ID) that has leaked.

The present invention has been accomplished in view of the foregoing situation, with an object to provide a communication system that allows skipping troublesome operation for set-up (certification) such as the pairing, and is capable of preventing leakage of confidential information from an electronic apparatus.

Another object of the present invention is to provide an information processing system that allows skipping troublesome operation for set-up (certification) such as the pairing, and insertion and removal of the card-type memory into and from a multifunction machine, and is capable of preventing leakage of confidential information from an electronic apparatus.

Still another object of the present invention is to provide an image forming apparatus that allows skipping troublesome operation for set-up (certification) such as the pairing.

Still another object of the present invention is to provide a portable information terminal device that allows skipping troublesome operation for set-up (certification) such as the pairing.

The present invention provides a communication system, comprising a portable electronic apparatus including a plurality of wireless communication means; and an information processing device that communicates with the electronic apparatus; wherein the information processing device includes: first communication means for communicating with the portable electronic apparatus; and second communication means for transmitting identification data relevant to the first communication means to the portable electronic apparatus; and the portable electronic apparatus includes: third communication means for receiving the identification data; and fourth communication means for communicating with the first communication means, utilizing the identification data received by the third communication means.

According to the present invention, when communication is made between the electronic apparatus and the information processing device, the second communication means acquires from the first communication means the identification data relevant thereto, and transmits the identification data to the third communication means of the electronic apparatus. Once the third communication means receives the identification data, the fourth communication means acquires the identification data and makes communication with the first communication means of the information processing device utilizing the identification data. Such arrangement allows skipping the troublesome operation for set-up (certification) such as the pairing. Also, in the case where the electronic apparatus is a mobile phone, the leakage of the confidential information can be prevented.

In the communication system according to the present invention, the second communication means and the third communication means may make communication based on the RFID system, to thereby perform shorter-range wireless communication than between the first communication means and the fourth communication means. According to the present invention, the third communication means and the second communication means may be, for example, a contact or non-contact IC card and a card reader respectively, designed for communication based on the RFID system, while the first communication means and the fourth communication means may both be Bluetooth®-compatible devices that perform wireless communication based on the Bluetooth technology.

In the communication system according to the present invention, the identification data may be stored in a free area in a storage region of the RFID system. Under such configuration, when the third communication means of the electronic apparatus receives the identification data relevant to the first communication means of the information processing device, the identification data is stored in the free area in the storage region of the RFID system.

The present invention provides an information processing system, comprising a portable electronic apparatus; and an information processing device that transmits and receives data to and from the electronic apparatus; wherein the information processing device includes: first transmission/reception means for transmitting and receiving data to and from the electronic apparatus; and second transmission means for transmitting identification data relevant to the first transmission/reception means to the electronic apparatus; wherein the electronic apparatus includes: second reception means for receiving the identification data; and third transmission/reception means for transmitting and receiving data to and from the first transmission/reception means, utilizing the identification data received by the second reception means. According to the present invention, when communication is made between the electronic apparatus and the information processing device, the second transmission means acquires from the first transmission/reception means the identification data relevant thereto, and transmits the identification data to the second reception means. Once the second reception means receives the identification data, the third transmission/reception means acquires the identification data and transmits data to the first transmission/reception means utilizing the identification data. Such arrangement allows skipping the troublesome operation for set-up (certification) such as the pairing. For example, in the case where the electronic apparatus and the information processing device are a mobile phone and a multifunction machine respectively, it is no longer necessary to insert and remove the small-sized card-type memory, which is difficult to handle, into and from the multifunction machine, for outputting (for instance, printing) the data in the card-type memory of the mobile phone. Also, in the case where the electronic apparatus is a mobile phone, the leakage of the confidential information can be prevented.

In the information processing system according to the present invention, the information processing device may include a display unit, acquisition means for acquiring contents data in the electronic apparatus, and display control means for causing the display unit to display an image based on the contents data acquired by the acquisition means. Under such configuration, the acquisition means of the information processing device acquires the contents data in the electronic apparatus, and the display control means causes the display unit to display the image based on the contents data acquired by the acquisition means.

In the information processing system according to the present invention, the electronic apparatus may include a display unit, so that when the electronic apparatus is brought close within a predetermined distance from the second transmission means, with an image based on desired contents data being displayed on the display unit, the third transmission/reception means may transmit the desired contents data to the first transmission/reception means. According to the present invention, in the case where the electronic apparatus and the information processing device are, for example, a mobile phone and a multifunction machine respectively, the image data is transmitted to the first transmission/reception means of the multifunction machine through the third transmission/reception means, by the user's action of holding the mobile phone over the second transmission means of the multifunction machine, with the desired image being displayed on the display unit.

In the information processing system according to the present invention, the information processing device may include notification means for notifying the electronic apparatus of the effect of occurrence of an abnormality in the data processing, or normal completion thereof. Under such configuration, in the case where an abnormality arises during the process that the information processing device acquires the data from the electronic apparatus and processes that data (for example, forming an image based on the data), or where such process has been normally completed, the notification means notifies that effect to the electronic apparatus.

In the information processing system according to the present invention, the second transmission means and the second reception means may make communication based on the RFID system, to thereby perform shorter-range wireless communication than between the first transmission/reception means and the third transmission/reception means. According to the present invention, the second transmission means and the second reception means may be, for example, a contact or non-contact IC card and a card reader respectively, designed for communication based on the RFID system, while the first transmission/reception means and the third transmission/reception means may both be Bluetooth®-compatible devices that perform wireless communication based on the Bluetooth technology.

The information processing system according to the present invention may be an image forming apparatus that forms an image based on the data acquired by the information processing device. In this case, the information processing device is the image forming apparatus that forms an image on a recording medium based on the contents data received, for example, by the first transmission/reception means through the third transmission/reception means of the electronic apparatus.

The present invention provides an image forming apparatus that acquires image data from an external device and forms an image based on the image data, comprising reception means for receiving the image data from the external device; and transmission means for transmitting identification data relevant to the reception means to the external device. According to the present invention, when the image forming apparatus receives the image data from the external device, the transmission means acquires from the reception means the identification data relevant thereto, and transmits the identification data to the external device. The external device receives the identification data, and transmits the image data to the reception means utilizing the identification data. Such arrangement allows skipping the troublesome operation for set up (certification) such as the pairing.

The image forming apparatus according to the present invention may include a display unit, acquisition means for acquiring contents data from the external device, and display control means for causing the display unit to display an image based on the contents data acquired by the acquisition means. Under such configuration, the acquisition means acquires the contents data in the external device, and the display control means causes the display unit to display the image based on the contents data acquired by the acquisition means.

The image forming apparatus according to the present invention may include notification means for notifying the external device of the effect of occurrence of an abnormality in the image formation, or normal completion thereof. Under such configuration, in the case where an abnormality arises during the process that the reception means receives the image data from the external device and forms the image based on the image data, or where such process has been normally completed, the notification means notifies that effect to the external device.

The present invention provides a portable information terminal device that communicates with an external device including two wireless communication means, comprising a first communication unit that communicates with one of the two wireless communication means in the external device; and a second communication unit that receives identification data relevant to the one of the wireless communication means in the external device through the other wireless communication means; wherein the first communication unit communicates with the one of the wireless communication means utilizing the identification data received by the second communication unit. According to the present invention, when communication is made with the external device, the second communication unit receives the identification data relevant to the one of the wireless communication means through the other wireless communication means, and the first communication unit communicates with the one of the wireless communication means utilizing the identification data. Such arrangement allows skipping the troublesome operation for set-up (certification) such as the pairing.

The portable information terminal device according to the present invention may employ the RFID system for the communication between the second communication unit and the other wireless communication means, and the identification data may be stored in a free area in the storage region of the RFID system. According to the present invention, the second communication unit and the other wireless communication means may be, for example, a contact or non-contact IC card and a card reader respectively, designed for communication based on the RFID system, and when the second communication unit receives the identification data relevant to the one of the wireless communication means in the external device, the identification data is stored in the free area in the storage region of the RFID system.

The portable information terminal device according to the present invention may include a display unit that displays an image based on the stored contents data, so that when the portable information terminal device is brought close within a predetermined distance from the other wireless communication means, with an image based on desired contents data being displayed on the display unit, the first communication unit may transmit the desired contents data to the one of the wireless communication means. According to the present invention, in the case where the portable information terminal device and the external device are, for example, a mobile phone and a multifunction machine respectively, the image data is transmitted to the one of the wireless communication means through the first communication unit, by the user's action of holding the mobile phone over the other wireless communication means of the multifunction machine, with the desired image being displayed on the display unit.

The above and further objects and features of the invention will more fully be apparent from the following detailed description with accompanying drawings.

DETAILED DESCRIPTION

Figure 1:
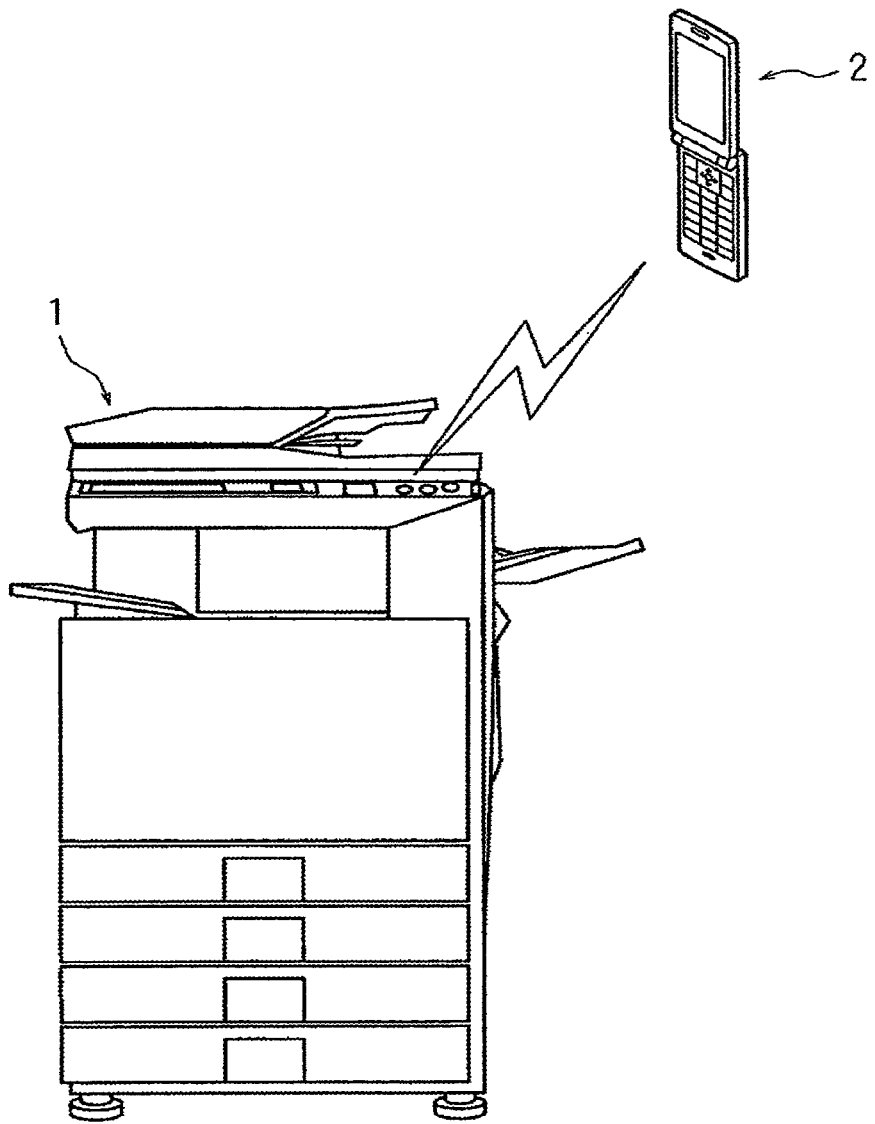
FIG. 1 is a drawing illustrating a concept of a communication system and an information processing system according to a first embodiment.

Hereunder, a first embodiment of the present invention will be described in details referring to the drawings, based on the case where the image forming apparatus (electronic apparatus) is exemplified by a digital multifunction machine with copying, printing and other functions, and where the communication system and the information processing system according to the present invention includes the digital multifunction machine and a mobile phone (communication device, external device) as constituents.

First Embodiment

Figure 2:
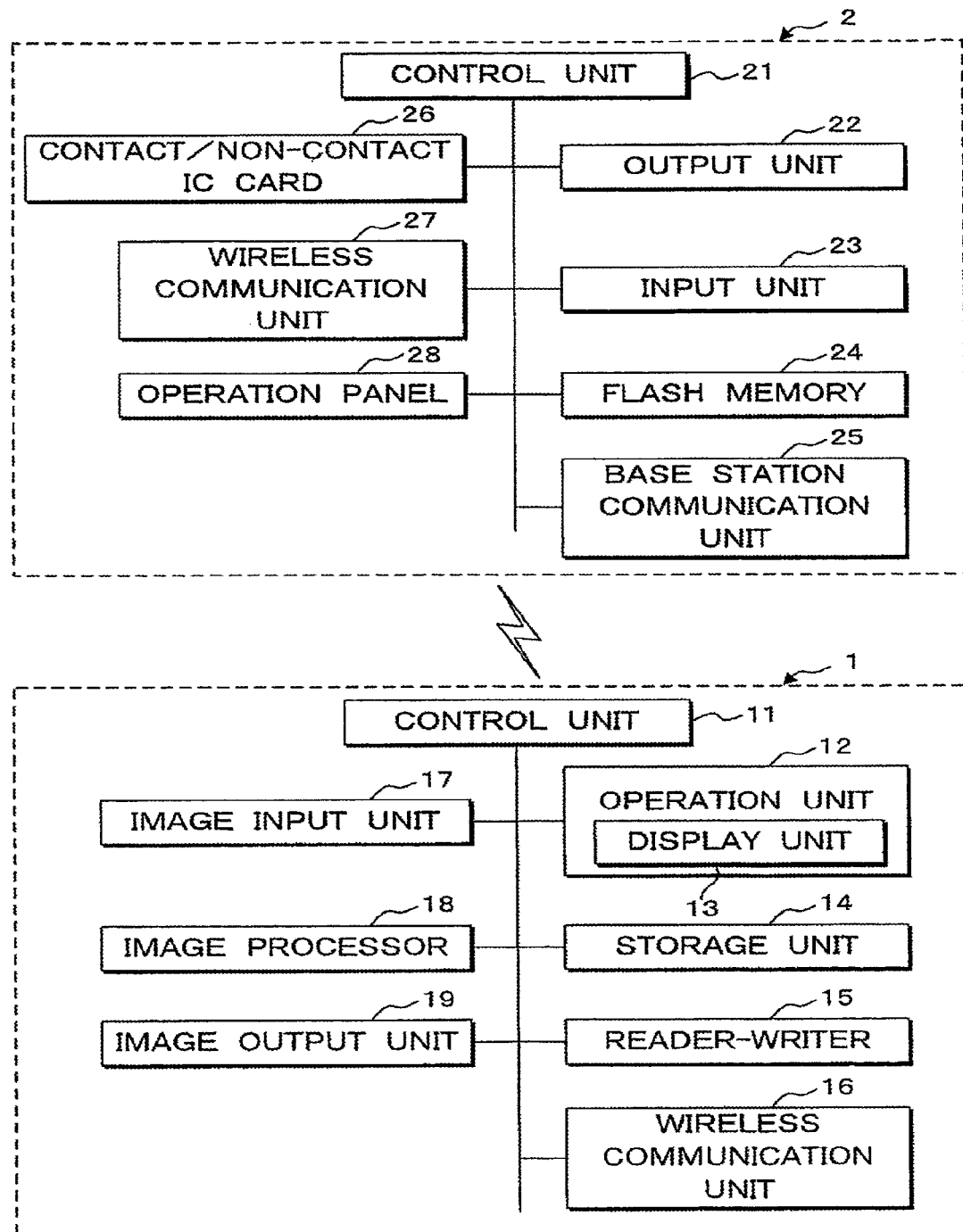
FIG. 2 is a block diagram showing an essential structure of the communication system and the information processing system according to the first embodiment.

FIG. 1 is a drawing illustrating a concept of the communication system and the information processing system according to the first embodiment according to the present invention, and FIG. 2 is a block diagram showing an essential structure of the communication system and the information processing system according to the first embodiment. The communication system and the information processing system according to the first embodiment include an image forming apparatus 1 and a mobile phone 2.

The image forming apparatus 1 includes hardware devices such as a control unit 11, an image input unit 17, an image processor 18, an image output unit 19, a storage unit 14, a wireless communication unit 16, a reader-writer 15, and an operation panel 12, and constitutes a digital multifunction machine as a whole.

The control unit 11 includes a CPU that controls those hardware devices, and a RAM that temporarily stores therein such data that are necessary for controlling. The storage unit 14 is, for example, a non-volatile semiconductor memory, and stores therein image data for image processing, control programs for controlling the respective hardware devices, a program for displaying a file list screen which will be described later, image data received through the wireless communication unit 16, and so forth. In the storage unit 14, a plurality of passkeys are stored in advance, so that in the case where the CPU of the control unit 11 receives the passkey through operation panels 28, 12, the CPU compares the received passkey with the passkey stored in advance in the storage unit 14.

Also, the control unit 11 loads the control program from the storage unit 14 when necessary, and executes the loaded control program to thereby activate the overall apparatus as the image forming apparatus according to the present invention.

The operation panel 12 includes various buttons for inputting instructions of the user, an enter key for validating the instruction, ten-keys, and so on. The operation panel 12 also includes a display unit 13 constituted of an LCD for example, to thereby display a list of file names (contents data) of images, compositions and so on stored in the mobile phone 2. Here, the display unit 13 is provided with a touch panel function.

The image input unit 17 is a reading unit that optically reads an image of a source document, and includes a light source that emits light to the document to be read, an image sensor such as a charge-coupled device (CCD), and so forth. The image input unit 17 forms an image on the image sensor from the reflected light image of the document set at a predetermined position, and outputs analog electrical signals representing the RGB colors (Red, Green, Blue). The analog electrical signals outputted by the image input unit 17 are inputted to the image processor 18.

The image output unit 19 forms an image on a sheet such as paper, an OHP film, based on the image data outputted from the image processor 18. To do so, the image output unit 19 includes a photoconductive drum, a charger that charges the photoconductive drum to a predetermined potential, a laser writer that emits a laser beam based on the image data received from outside so as to form a static latent image on the photoconductive drum, a developing device that supplies a toner to the static latent image formed on the photoconductive drum surface, to thereby visualize the image, and a transfer unit that transfers the toner image formed on the photoconductive drum surface to a paper (not shown), and employs an electronic photography process to form the image required by the user on the sheet. Here, the image formation may be performed through an inkjet process, a thermal transfer process, or a sublimation process, instead of the electronic photography utilizing the laser writer.

The image processor 18 generates digital image data based on an analog electrical signal inputted through the image input unit 17, and generates the image data for outputting after processing according to the type of the image. The image data thus generated is outputted to the image output unit 19 or the wireless communication unit 16.

The wireless communication unit 16 is compatible with the Bluetooth® technology for example, and achieves wireless connection with another Bluetooth-compatible device (for example, wireless communication unit 27 to be described later) located within a predetermined short range (for instance, 100 mm). To be more detailed, the Bluetooth-compatible device has its exclusive Bluetooth address (identification data), and executes an identification process (certification), called pairing, with a connection counterpart based on the Bluetooth address of each other through a short-range ad hoc network called piconet, to thereby enable wireless connection and communication with the counterpart Bluetooth-compatible device. The piconet is dynamically and automatically built up and cancelled, each time that the counterpart Bluetooth-compatible device enters the predetermined range and goes out of that range. The wireless communication unit 16 may also be a device compatible with IEEE802.11, instead of the Bluetooth-compatible device. In this case, however, the wireless communication unit 27 to be subsequently described, which acts as the counterpart of the wireless communication unit 16, also has to be compatible with IEEE802.11.

The reader-writer 15 transmits and receives data to and from a contact/non-contact IC card 26 to be subsequently described, with or without mutual contact, based on what is known as a non-contact communication system (Radio Frequency Identification (RFID) system). Hereunder, explanation will be given on the non-contact communication system between the reader-writer 15 and the contact/non-contact IC card 26. The reader-writer 15 constantly emits an activation signal (electromagnetic wave), so that when the contact/non-contact IC card 26 and the reader-writer 15 come close enough to each other to make communication, the contact/non-contact IC card 26 receives the electromagnetic wave emitted by the reader-writer 15. The contact/non-contact IC card 26 rectifies, upon receipt of the electromagnetic wave, the carrier wave of the electromagnetic wave to thereby generate a DC power source, which is utilized for driving an internal circuit. The contact/non-contact IC card 26 then modulates the amplitude and transmits a response signal corresponding to the activation signal. A RFID system such as Felica®, or Edy® may be employed. The reader-writer 15 transmits the exclusive Bluetooth address (identification data) of the wireless communication unit 16 to the contact/non-contact IC card 26.

The mobile phone 2 includes a control unit 21 including a CPU that controls the entire device, a ROM that stores therein programs and various data, and a RAM that accepts high-speed writing and reading, and a large-capacity flash memory 24 for storing therein phone numbers, image data and so forth. The flash memory 24 also stores therein data such as a list (contents data) of images and documents in the mobile phone 2, thumbnails of the images and so on.

The mobile phone 2 also includes a base station communication unit 25 with a communication interface for communicating with a base station, an operation panel 28 including press buttons for accepting user's operation, a camera for acquiring an image by photoshooting, an input unit 23 including a microphone for receiving an input of a sound, and an output unit 22 such as an LCD monitor on which an image is outputted or a speaker that outputs a sound.

The mobile phone 2 further includes the contact/non-contact IC card 26 and the wireless communication unit 27. The contact/non-contact IC card 26 serves to transmit and receive data to and from the reader-writer 15 with or without mutual contact, based on what is known as the non-contact communication process. In this case also, Felica® or Edy® system may be adopted. The wireless communication unit 27 is, as stated earlier, compatible with, for example, the Bluetooth® technology, and executes wireless connection and communication with another Bluetooth-compatible device (for example, wireless communication unit 16) when such another Bluetooth-compatible device is within the predetermined short range (for instance, 100 mm).

Hereunder, description will be given on the communication process and the image formation process, to be executed by the image forming apparatus 1 and the mobile phone 2 based on the communication system and the information processing system according to the first embodiment of the present invention. The following description represents the case where a digital multifunction machine, which exemplifies the image forming apparatus 1 according to the present invention, is employed to print an image based on the image data stored in the user's mobile phone 2.

Figure 3:
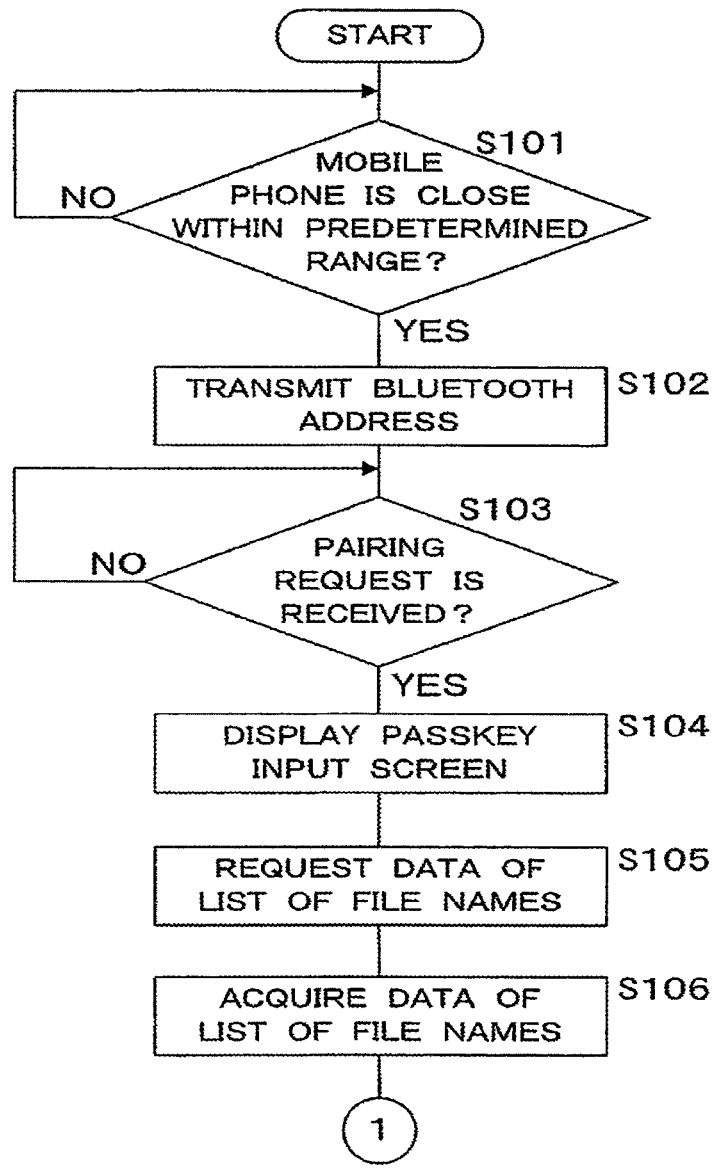
FIG. 3 is a flowchart showing a procedure to be executed by a CPU of a control unit of an image forming apparatus, in the communication system and the information processing system according to the first embodiment.
Figure 4:
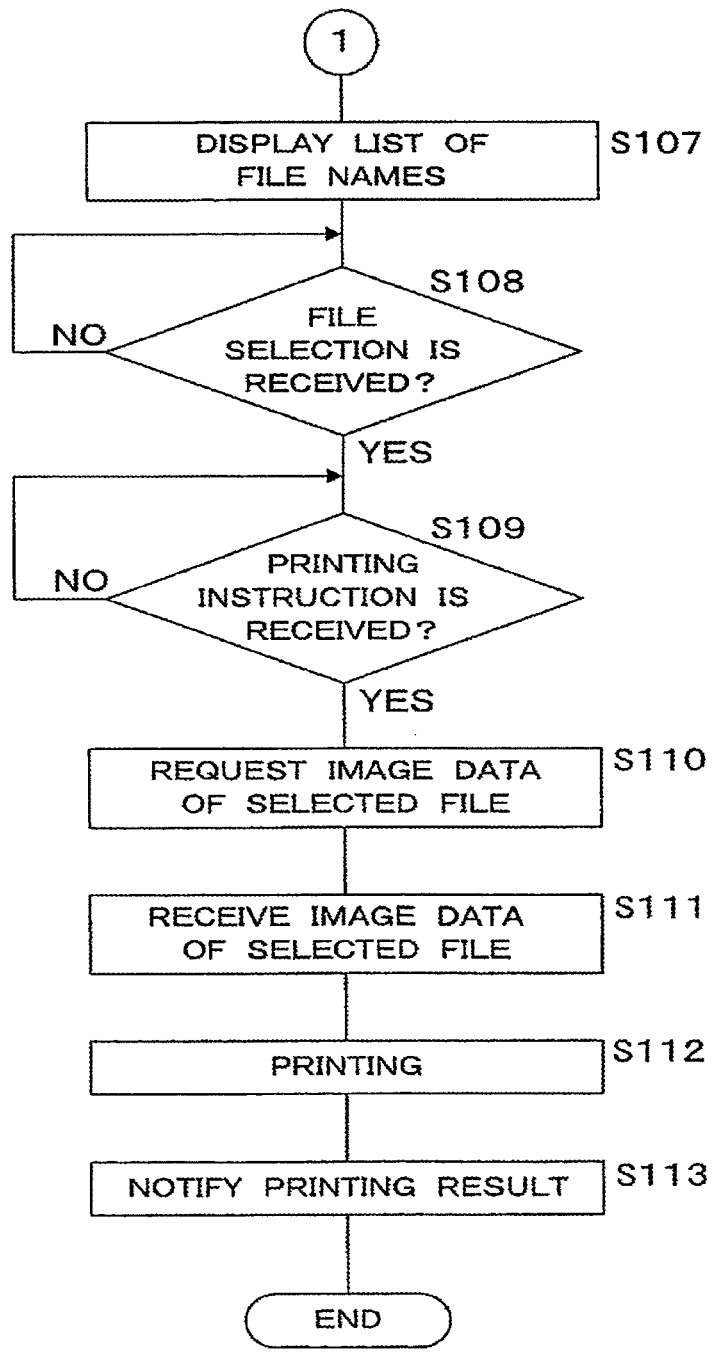
FIG. 4 is the flowchart showing a procedure to be executed by the CPU of the control unit of the image forming apparatus, in the communication system and the information processing system according to the first embodiment.
Figure 5:
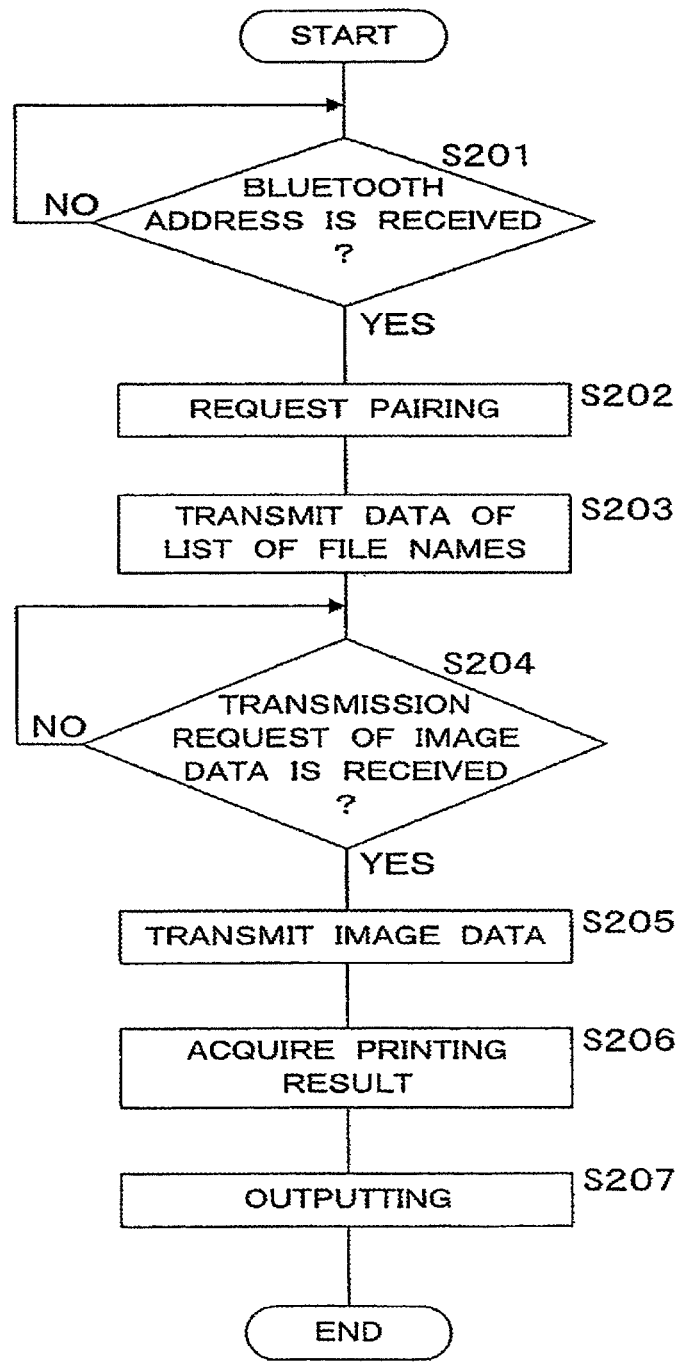
FIG. 5 is a flowchart showing a procedure to be executed by a CPU of a control unit of a mobile phone, in the communication system and the information processing system according to the first embodiment.

FIG. 3 and FIG. 4 are flowcharts showing a procedure to be executed by the CPU of the control unit 11 of the image forming apparatus 1, and FIG. 5 is a flowchart showing a procedure to be executed by the CPU of the control unit 21 of the mobile phone 2. As already stated, the image forming apparatus 1 and the mobile phone 2 are both Bluetooth-compatible devices, in the communication system and the information processing system according to the first embodiment of the present invention.

The CPU of the image forming apparatus 1 decides whether the mobile phone 2 is close within the predetermined range (step S101). As stated earlier, the image forming apparatus 1 includes the reader-writer 15, and the mobile phone 2 includes the contact/non-contact IC card 26. The reader-writer 15 of the image forming apparatus 1 constantly emits the activation signal (electromagnetic wave), so that, for example, when the user holds up the mobile phone 2 over the reader-writer 15 of the image forming apparatus 1, contact/non-contact IC card 26 of the mobile phone 2 emits the response signal corresponding to the activation signal to the reader-writer 15, through the foregoing process. The CPU of the image forming apparatus 1 decides that the mobile phone 2 is close within the predetermined range upon receipt of the response signal.

In the case where the CPU of the image forming apparatus 1 decides that the mobile phone 2 is not located within the predetermined range (step S101: NO), the CPU waits until the mobile phone 2 enters the predetermined range. Upon deciding that the mobile phone 2 is close within the predetermined range (step S101: YES), the CPU of the image forming apparatus 1 reads out the Bluetooth address of the wireless communication unit 16 (hereinafter, image forming apparatus-side address) and transmits the address to the reader-writer 15, and the reader-writer 15 transmits the image forming apparatus-side address (identification data) to the contact/non-contact IC card 26 of the mobile phone 2 (step S102).

Meanwhile, the CPU of the mobile phone 2 monitors the contact/non-contact IC card 26, to thereby decide whether the image forming apparatus-side address has been received (step S201). In the case where the CPU of the mobile phone 2 decides that the image forming apparatus-side address has not been received (step S201: NO), the CPU waits until the image forming apparatus-side address is received. Upon deciding that the image forming apparatus-side address has been received (step S201: YES), the CPU of the mobile phone 2 stores the received image forming apparatus-side address in a memory region of the contact/non-contact IC card 26.

Figure 6:
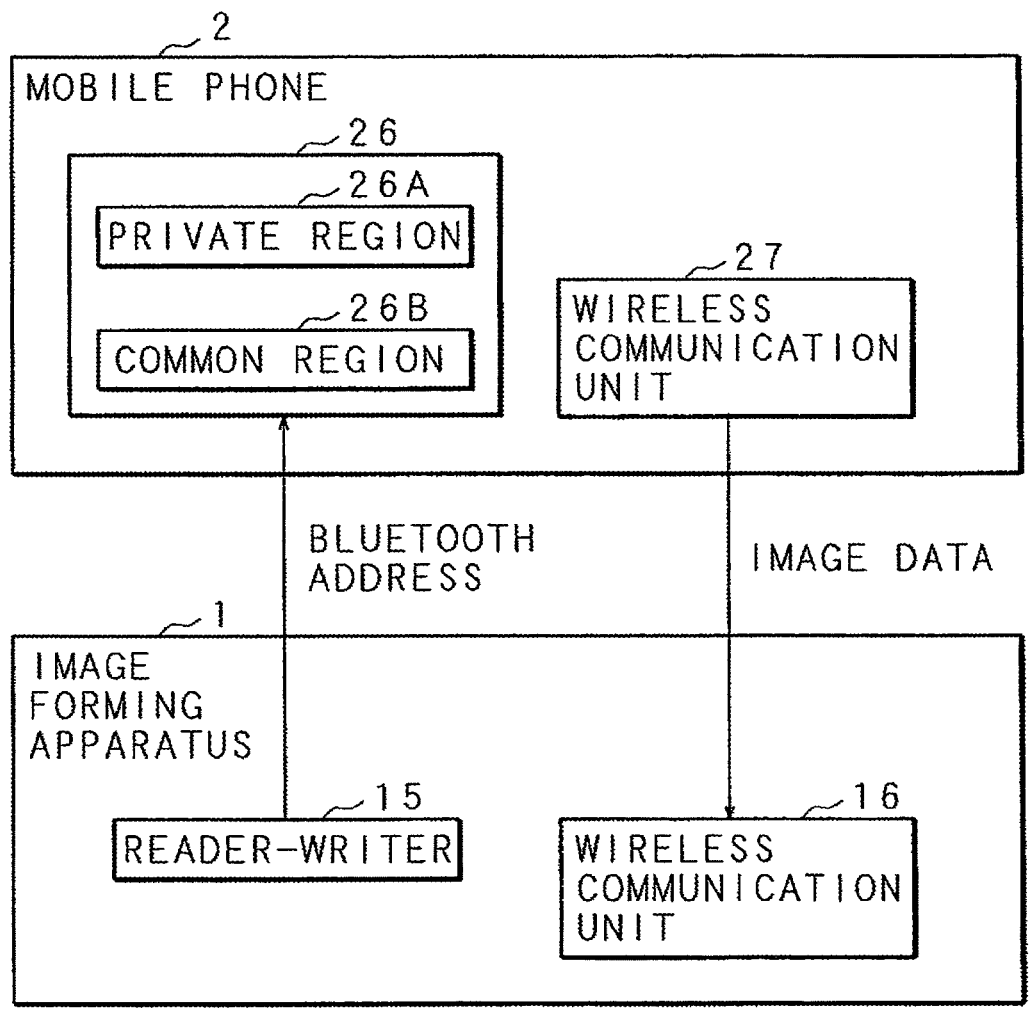
FIG. 6 is a block diagram for explaining a structure of a flash memory of the mobile phone, in the communication system and the information processing system according to the first embodiment.

FIG. 6 is a block diagram for explaining a configuration of the flash memory 24. The memory region of the contact/non-contact IC card 26 includes a common region 26B and a private region 26A (free area). The received image forming apparatus-side address (identification data) is written in the private region 26A of the contact/non-contact IC card 26. The private region 26A is a region that a service provider can freely utilize. Utilizing the private region 26A enables the writing with a higher degree of freedom. Although the data can also be written in the common region, in this case a remote publishing system of the card networks has to be utilized, which leads to the drawback that the degree of freedom in writing is reduced.

The CPU of the mobile phone 2 then requests the pairing to the image forming apparatus 1 (step S202). To make the pairing request, the wireless communication unit 27 of the mobile phone 2 transmits the Bluetooth address of the wireless communication unit 27 (hereinafter, mobile phone-side address) and data to the effect of requesting the pairing, to the wireless communication unit 16 of the image forming apparatus 1, utilizing the image forming apparatus-side address.

Meanwhile, the CPU of the image forming apparatus 1 monitors the wireless communication unit 16, to thereby decide whether the pairing request has been received from the mobile phone 2 (step S103). In the case where the CPU of the image forming apparatus 1 decides that the pairing request has not been received (step S103: NO), the CPU waits until the pairing request is received from the mobile phone 2.

The CPU of the image forming apparatus 1 displays, upon deciding that the pairing request has been received (step S103: YES), a passkey input screen on the display unit 13 of the operation panel 12, thus requesting the user to input the passkey through the mobile phone 2 (step S104). The CPU of the image forming apparatus 1 accepts the passkey inputted by the user through the operation panel 28 (or the touch panel of the display unit 13), and compares the passkey with a passkey stored in advance in the storage unit 14, so that the communication is established upon deciding that the passkey is correct. In other words, at this stage the pairing is completed, and the image forming apparatus 1 and the mobile phone 2 are made communicatable with each other. Then the CPU of the image forming apparatus 1 transmits data to the effect of requesting a list of file names of images, compositions and so on in the mobile phone 2, to the mobile phone 2 through the wireless communication unit 16 (step S105).

Once the wireless communication unit 27 receives the data to the effect of requesting the list of file names from the image forming apparatus 1, the CPU of the mobile phone 2 reads out the list of file names of images, compositions and so on stored in the flash memory 24, and transmits the list to the image forming apparatus 1 through the wireless communication unit 27 (step S203).

The CPU of the image forming apparatus 1 acquires the data of list of file names transmitted from the mobile phone 2 by receiving through the wireless communication unit 16 (step S106), and stores the data in the storage unit 14. The CPU of the image forming apparatus 1 then displays the file list screen on the display unit 13 for user's selection of the file to be printed, based on the file list data stored in the storage unit 14 (step S107).

Figure 7:
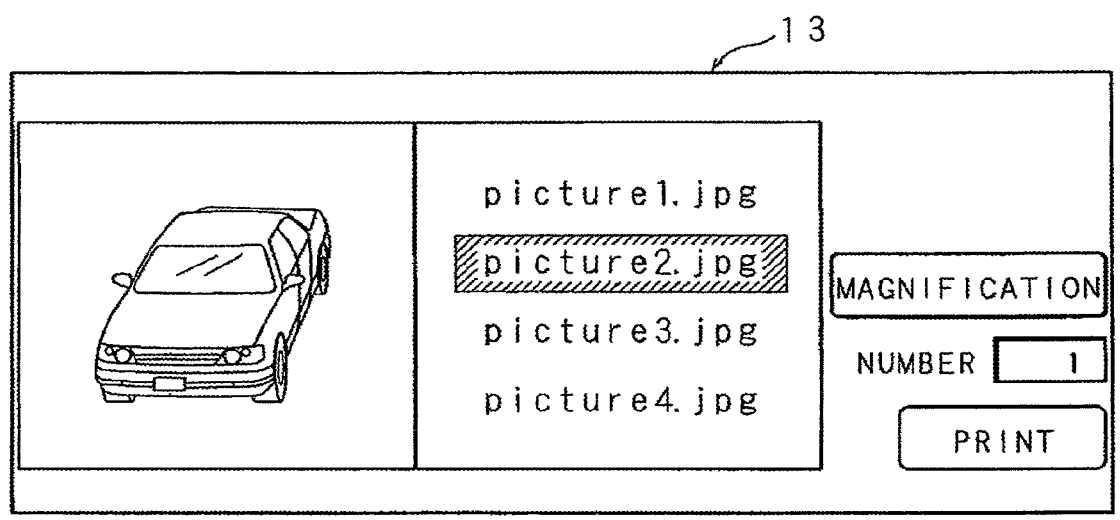
FIG. 7 is a drawing illustrating a list screen of file names displayed on a display unit of the image forming apparatus.

FIG. 7 illustrates an example of the list screen of file names displayed on the display unit 13 of the image forming apparatus 1. The list screen of file names displays in a scrollable manner a plurality of file names based on the data of list of file names, as well as a thumbnail of the file selected by the user by manipulating the operation panel 12 or the display unit 13 (touch panel). The list screen of file names also displays soft keys such as "number of copies" and "magnification", to thereby accept the user's instruction on the number of copies to be printed and level of magnification. After selecting the file to be printed and inputting the printing instructions, the user presses the soft key of "print", thus instructing to start printing. In this case, since the operation is performed on the larger display unit 13 of the image forming apparatus 1 instead of the small LCD monitor screen of the mobile phone 2, the image reference and the key manipulation can be easily done.

The CPU of the image forming apparatus 1 monitors the operation panel 12 and the touch panel of the display unit 13, to thereby decide whether the user's file selection has been received (step S108). In the case where the CPU of the image forming apparatus 1 decides that the file selection has not been received (step S108: NO), the CPU waits until the file selection is received from the user. The CPU of the image forming apparatus 1 then decides, upon deciding that the user's file selection has been received (step S108: YES), whether the printing instruction has been received from the user (step S109). Such decision is made through monitoring the operation panel 12 and the touch panel of the display unit 13, by the CPU.

In the case where the CPU of the image forming apparatus 1 decides that the printing instruction has not been received (step S109: NO), the CPU waits until the printing instruction is received from the user. Upon deciding that the printing instruction has been received from the user (step S109: YES), the CPU of the image forming apparatus 1 requests the mobile phone 2 to provide the image data corresponding to the selected file (step S110). Such request is made through transmitting data to the effect of requesting the transmission of the image data of the selected file, to the mobile phone 2 through the wireless communication unit 16.

Meanwhile, the CPU of the mobile phone 2 monitors the wireless communication unit 27, to thereby decide whether the transmission request of the image data of the selected file has been received from the image forming apparatus 1 (step S204). In the case where the CPU of the mobile phone 2 decides that the transmission request of the image data of the selected file has not been received (step S204: NO), the CPU waits until the transmission request of the image data of the selected file is received. Then upon deciding that the transmission request of the image data of the selected file has been received (step S204: YES), the CPU of the mobile phone 2 reads out the image data of the selected file from the flash memory 24, and transmits the image data to the image forming apparatus 1 through the wireless communication unit 27 (step S205).

Once the CPU of the image forming apparatus 1 receives the image data of the selected file from the mobile phone 2 through the wireless communication unit 16 (step S111), the CPU stores the image data in the storage unit 14. The CPU of the image forming apparatus 1 then transmits the image data stored in the storage unit 14 to the image output unit 19 and instructs the image output unit 19 to print the image based on the image data, thereby printing the image based on the image data (step S112). Through the printing process, the CPU of the image forming apparatus 1 transmits data to the effect of notifying the printing result, such that the printing has been normally completed, or that an abnormality has arisen, to the mobile phone 2 through the wireless communication unit 16 (step S113).

The CPU of the mobile phone 2 acquires the data to the effect of notifying the printing result from the image forming apparatus 1, through the wireless communication unit 27 (step S206), and stores the data in the flash memory 24. The CPU of the mobile phone 2 then outputs the data to the effect of notifying the printing result stored in the flash memory 24, through the output unit 22 (step S207). Such outputting may be performed, for example, by displaying a text notifying the printing result on the LCD monitor of the mobile phone 2, or by outputting a voice or an alarm notifying the printing result through the speaker of the mobile phone 2.

As described throughout the foregoing passages, the communication system and the information processing system according to the present invention are designed such that the image forming apparatus-side address is received from the image forming apparatus 1 and the user utilizes the image forming apparatus-side address to transmit the data to the image forming apparatus 1, and therefore can prevent leakage of confidential information relevant to the mobile phone 2 such as the address and passkey, unintended by the user.

The first embodiment exemplifies the case where the user manually inputs the passkey for assured accuracy in setting the passkey, however in the case where simplicity in operation is a prior factor the delivery of the passkey may be performed through the reader-writer 15 of the image forming apparatus 1 and the contact/non-contact IC card 26 of the mobile phone 2.

Here, in the case of those devices not designed for inputting the passkey (mouse, headset, and the like), the passkey may be set as a fixed value, or the system may exclude the need to input the passkey. For the device not designed for inputting the passkey, for example a passkey of simple digits such as "0000" may be set as a default value.

Second Embodiment

Figure 8:
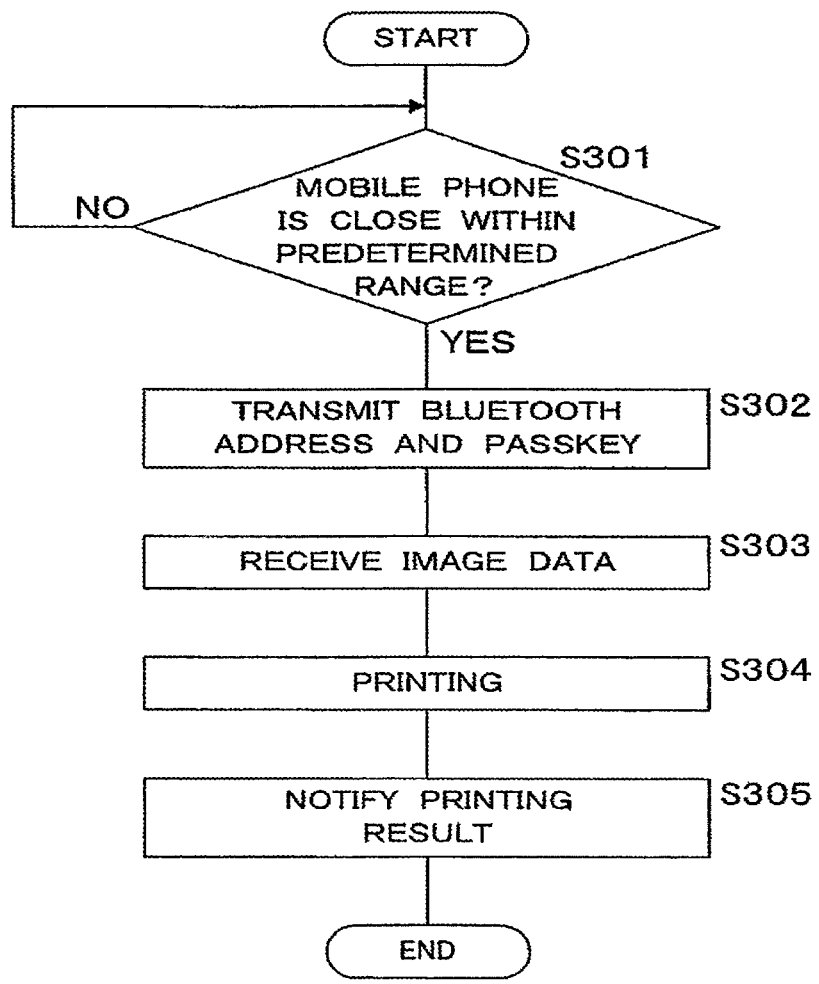
FIG. 8 is a flowchart showing a procedure to be executed by a CPU of a control unit of an image forming apparatus, in a communication system and an information processing system according to a second embodiment.
Figure 9:
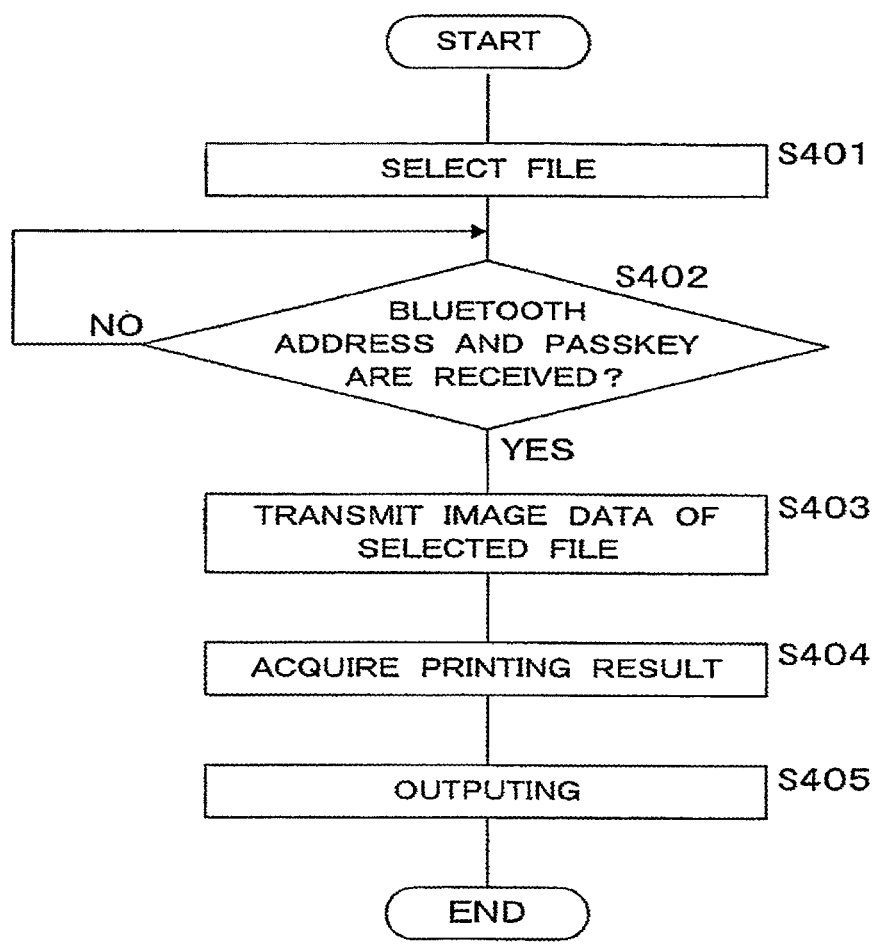
FIG. 9 is a flowchart showing a procedure to be executed by a CPU of a control unit of a mobile phone, in the communication system and the information processing system according to the second embodiment.

Hereunder, description will be given on a communication process and an image formation process of the image forming apparatus 1 and the mobile phone 2 to be performed by the communication system and the information processing system according to a second embodiment of the present invention. The following description represents the case where a digital multifunction machine, which exemplifies the image forming apparatus 1 according to the present invention, is employed to print an image based on the image data stored in the user's mobile phone 2. In the communication system and the information processing system according to the second embodiment of the present invention, the delivery of the passkey is performed through the reader-writer 15 of the image forming apparatus 1 and the contact/non-contact IC card 26 of the mobile phone 2. FIG. 8 is a flowchart showing a procedure to be executed by the CPU of the control unit 11 of the image forming apparatus 1, and FIG. 9 is a flowchart showing a procedure to be executed by the CPU of the control unit 21 of the mobile phone 2.

Figure 10:
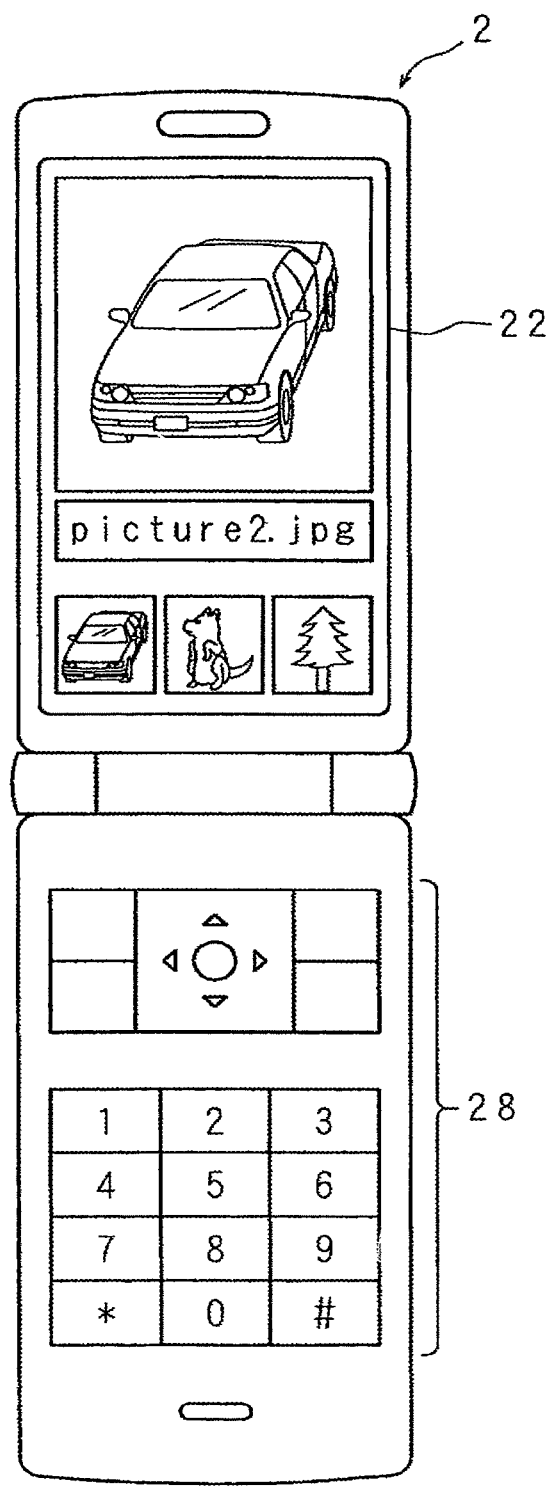
FIG. 10 is a front view of the mobile phone for explaining an operation for selecting a file to be printed.

First, the user of the mobile phone 2 manipulates the mobile phone 2 so as to select a file to be printed (step S401). FIG. 10 is a front view of the mobile phone 2 for explaining an operation for selecting the file to be printed. On the LCD monitor (output unit 22) of the mobile phone 2, thumbnails of image data stored in the flash memory 24 are displayed, for selection of one of the thumbnails by operating a key (operation panel 28 including press buttons and so on) thereby moving a cursor. Upon selecting a desired thumbnail, the name of the file represented by the selected thumbnail (hereinafter, selected file) and a larger image than the thumbnail are displayed on the output unit 22. Then the user holds up the mobile phone 2, on which the file to be printed has been selected, over the reader-writer 15 of the image forming apparatus 1.

Meanwhile, the CPU of the image forming apparatus 1 decides whether the mobile phone 2 is close within the predetermined range, by the method described earlier (step S301). In the case where the CPU of the image forming apparatus 1 decides that the mobile phone 2 is not located within the predetermined range (step S301: NO), the CPU waits until the mobile phone 2 enters the predetermined range. The CPU of the image forming apparatus 1 reads out, upon deciding that the mobile phone 2 is close within the predetermined range (step S301: YES), the Bluetooth address of the wireless communication unit 16 (hereinafter, image forming apparatus-side address) and the passkey, and transmits the address and the passkey to the reader-writer 15, and the reader-writer 15 transmits the image forming apparatus-side address to the contact/non-contact IC card 26 of the mobile phone 2 (step S302).

The CPU of the mobile phone 2 monitors the contact/non-contact IC card 26, to thereby decide whether the image forming apparatus-side address and the passkey have been received (step S402). In the case where the CPU of the mobile phone 2 decides that the image forming apparatus-side address and the passkey have not been received (step S402: NO), the CPU waits until the image forming apparatus-side address and the passkey are received. Upon deciding that the image forming apparatus-side address and the passkey have been received (step S402: YES), the CPU of the mobile phone 2 stores the received image forming apparatus-side address and the passkey in the flash memory 24. Then the CPU of the mobile phone 2 reads out the image data of the selected file from the flash memory 24, and transmits the data to the image forming apparatus 1 through the wireless communication unit 27, utilizing the image forming apparatus-side address and the passkey (step S403).

Once the CPU of the image forming apparatus 1 receives the image data of the selected file from the mobile phone 2 through the wireless communication unit 16 (step S303), the CPU stores the image data in the storage unit 14. The CPU of the image forming apparatus 1 then transmits the image data stored in the storage unit 14 to the image output unit 19, and instructs the image output unit 19 to print the image based on the image data (step S304). Through the printing process, the CPU of the image forming apparatus 1 transmits data to the effect of notifying the printing result, such that the printing has been normally completed, or that an abnormality has arisen, to the mobile phone 2 through the wireless communication unit 16 (step S305).

The CPU of the mobile phone 2 acquires the data to the effect of notifying the printing result from the image forming apparatus 1, through the wireless communication unit 27 (step S404), and stores the data in the flash memory 24. The CPU of the mobile phone 2 then outputs the data to the effect of notifying the printing result stored in the flash memory 24, through the output unit 22 (step S405).

The foregoing configuration of the communication system and the information processing system according to the second embodiment allows immediately printing the image simply by bringing the mobile phone 2, on which the file to be printed has been selected, close to the image forming apparatus 1, thus significantly simplifying the printing process.

The same constituents as those of the first embodiment are given the same numerals and detailed description thereof will not be repeated.

Although the communication system, the information processing system, the image forming apparatus and the portable information terminal device according to the present invention have been described referring to the digital multifunction machine (image forming apparatus 1) and the mobile phone 2 as examples, the present invention is not limited to such combination. For example, the mobile phone may be replaced with a digital camera with a communication function, or instead a mobile computer or a portable terminal called PDA. Also, instead of transmitting the data from the mobile phone, image data read out by a scanner of the digital multifunction machine may be transmitted to the mobile phone. The present invention may further be applied to transmission of facsimile image data or electronic data stored in the storage device of the digital multifunction machine to the mobile phone. Further, between devices each including two or more communication units for mutual communication, for example as the reader-writer 15 and the wireless communication unit 16 of the digital multifunction machine (image forming apparatus 1), and as the contact/non-contact IC card 26 and the wireless communication unit 27 of the mobile phone 2, the advantages of the present invention can equally be achieved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus that has a receiving section receiving data from an external device and forms an image based on the received data, comprising:
   a sending section that sends a communication address of the image forming apparatus to the external device,
   wherein the receiving section receives data sent with the communication address by the external device,
   wherein a communication between the external device and the image forming apparatus is performed wirelessly,
   wherein the data is image data or composition data,
   wherein when image data or composition data which is selected from image data or composition data stored in the external device by a user for the external device is sent with the communication address from the external device, the receiving section receives the selected image data or composition data, and
   wherein after the communication between the external device and the image forming apparatus is established with a non-contact wireless method by bringing the external device close to the image forming apparatus, and holding the external device over the image forming apparatus in a state that the image is displayed on the external device, the data related to the displayed image is outputted to the image forming apparatus with the IEEE802.11 standard.

2. A communication system that has an external device and has an image forming apparatus which comprises a receiving section receiving data from the external device and which forms an image based on the received data,
   wherein the image forming apparatus comprises a sending section that sends a communication address of the image forming apparatus to the external device,
   wherein the receiving section receives data sent with the communication address by the external device,
   wherein a communication between the external device and the image forming apparatus is performed wirelessly,
   wherein the data is image data or composition data,
   wherein the external device comprises a sending section that sends image data or composition data which is selected from image data or composition data stored in a storage section by a user for the external device with the communication address to the image forming apparatus,
   wherein the image forming apparatus receives image data or composition data by the receiving section when image data or composition data is sent with the communication address from the external device, and
   wherein after the communication between the external device and the image forming apparatus is established with a non-contact wireless method by bringing the external device close to the image forming apparatus, and holding the external device over the image forming apparatus in a state that the image is displayed on the external device, the data related to the displayed image is outputted to the image forming apparatus with the IEEE802.11 standard.

3. A communication method with an external device and with an image forming apparatus that includes a receiving section receiving data from the external device and forms an image based on the received data,
   wherein the image forming apparatus makes a sending section send a communication address of the image forming apparatus to the external device,
   wherein the image forming apparatus makes the receiving section receive data sent with the communication address by the external device,
   wherein a communication between the external device and the image forming apparatus is performed wirelessly,
   wherein the data is image data or composition data,
   wherein when image data or composition data which is selected from image data or composition data stored in the external device by a user for the external device is sent with the communication address by the external device, the receiving section receives the selected image data or composition data, and
   wherein after the communication between the external device and the image forming apparatus is established with a non-contact wireless method by bringing the external device close to the image forming apparatus, and holding the external device over the image forming apparatus in a state that the image is displayed on the external device, the data related to the displayed image is outputted to the image forming apparatus with the IEEE802.11 standard.

4. An external device that communicates wirelessly to an image forming apparatus which comprises a receiving section receiving data from the external device and a sending section sending a communication address of the image forming apparatus to the external device, which makes the receiving section receive data sent with the communication address by the external device, and which forms an image based on the received data,
   wherein the data is image data or composition data,
   further comprising a sending section that sends image data or composition data which is selected from image data or composition data stored in a storage section by a user for the external device with the communication address to the image forming apparatus,
   wherein after the communication between the external device and the image forming apparatus is established with a non-contact wireless method by bringing the external device close to the image forming apparatus, and holding the external device over the image forming apparatus in a state that the image is displayed on the external device, the data related to the displayed image is outputted to the image forming apparatus with the IEEE802.11 standard.

5. A non-transitory recording medium recording a program executed by an external device that communicates wirelessly to an image forming apparatus which comprises a receiving section receiving data from the external device and a sending section sending a communication address of the image forming apparatus to the external device, which makes the receiving section receive data sent with the communication address by the external device, and which forms an image based on the received data, wherein the data is image data or composition data, wherein the program causes the external device to execute sending image data or composition data which is selected from image data or composition data stored in a storage section by a user for the external device with the communication address to the image forming apparatus, and wherein after the communication between the external device and the image forming apparatus is established with a non-contact wireless method by bringing the external device close to the image forming apparatus, and holding the external device over the image forming apparatus in a state that the image is displayed on the external device, the data related to the displayed image is outputted to the image forming apparatus with the IEEE802.11 standard.

* * * * *